United States Patent
Toge et al.

(10) Patent No.: US 11,492,482 B2
(45) Date of Patent: Nov. 8, 2022

(54) ACRYLIC RUBBER

(71) Applicant: UNIMATEC CO., LTD., Tokyo (JP)

(72) Inventors: Daichi Toge, Ibaraki (JP); Daiki Watanabe, Ibaraki (JP)

(73) Assignee: UNIMATEC CO., LTD., Tokyo (JP)

( * ) Notice: Subject to any disclaimer, the term of this patent is extended or adjusted under 35 U.S.C. 154(b) by 214 days.

(21) Appl. No.: 16/759,506

(22) PCT Filed: Oct. 24, 2018

(86) PCT No.: PCT/JP2018/039415
§ 371 (c)(1),
(2) Date: Apr. 27, 2020

(87) PCT Pub. No.: WO2019/087876
PCT Pub. Date: May 9, 2019

(65) Prior Publication Data
US 2020/0299443 A1    Sep. 24, 2020

(30) Foreign Application Priority Data

Oct. 31, 2017 (JP) .............................. JP2017-210920

(51) Int. Cl.
| | | |
|---|---|---|
| *C08F 220/18* | (2006.01) | |
| *C08F 220/14* | (2006.01) | |
| *C08L 33/14* | (2006.01) | |
| *C08F 220/28* | (2006.01) | |
| *C09K 3/10* | (2006.01) | |

(52) U.S. Cl.
CPC ........ *C08L 33/14* (2013.01); *C08F 220/1808* (2020.02); *C08F 220/281* (2020.02); *C08F 220/282* (2020.02); *C09K 3/10* (2013.01); *C08F 2810/20* (2013.01); *C09K 2200/0625* (2013.01); *C09K 2200/0642* (2013.01)

(58) Field of Classification Search
CPC .......... C08F 220/1808; C08F 220/1802; C08F 220/14; C08F 220/281; C08F 222/16
See application file for complete search history.

(56) References Cited

U.S. PATENT DOCUMENTS

| | | | | |
|---|---|---|---|---|
| 5,574,117 A | * | 11/1996 | Yoshida ................. | C08F 20/06 526/224 |
| 2009/0005512 A1 | * | 1/2009 | Masuda ............... | C08F 220/12 525/222 |
| 2011/0040043 A1 | * | 2/2011 | Ito ........................ | C07D 339/08 525/348 |
| 2017/0121439 A1 | * | 5/2017 | Emori ................... | C08K 5/205 |
| 2020/0002523 A1 | * | 1/2020 | Furuko ................. | C08K 3/04 |
| 2020/0332039 A1 | * | 10/2020 | Nakano ................ | C08L 33/08 |

FOREIGN PATENT DOCUMENTS

| | | | | |
|---|---|---|---|---|
| EP | 1550694 A1 | * | 7/2005 | ........... C08K 5/0025 |
| JP | 3-160008 A | | 7/1991 | |
| JP | 11-140407 A | | 5/1999 | |
| JP | 2001-64612 A | | 3/2001 | |
| JP | 2008-214418 A | | 9/2008 | |
| JP | 2013-49741 A | | 3/2013 | |
| WO | 2016/002936 A1 | | 1/2016 | |
| WO | Wo-2016002936 A1 | * | 1/2016 | |

OTHER PUBLICATIONS

International Search Report issued in International Patent Application No. PCT/JP2018/039415, dated Dec. 18, 2018, English translation.

International Preliminary Report on Patentability issued in International Patent Application No. PCT/JP2018/039415, dated May 5, 2020, English translation.

* cited by examiner

*Primary Examiner* — Karuna P Reddy
(74) *Attorney, Agent, or Firm* — Greenblum & Bernstein, P.L.C.

(57) ABSTRACT

An acrylic rubber contains a copolymer of a monomer mixture of: 25 to 46 wt. % of alkoxyalkyl acrylate, 23 to 37 wt. % of 2-ethylhexyl acrylate, 9 to 17 wt. % of alkyl methacrylate, 1 to 3 wt. % of monoalkyl fumarate and the remaining amount is ethyl acrylate. This acrylic rubber improves hydrolysis resistance by introducing a specific alkyl acrylic monomer with extremely low hydrolysis property i.e. low hydrophilicity, and at the same time satisfies all of oil resistance, cold resistance, and hydrolysis resistance in a well-balanced manner.

5 Claims, No Drawings

ACRYLIC RUBBER

TECHNICAL FIELD

The present invention relates to a acrylic rubber. More particularly, the present invention relates to m acrylic rubber having excellent hydrolysis resistance, etc.

BACKGROUND ART

Acrylic rubber has excellent oil resistance, heat resistance, cold resistance, etc., and is thus used for general sealing materials for automobiles. However, the following points have been desired to be improved.

(1) In recent years, there have been situations in which acrylic rubber is hydrolyzed and deteriorated due to long-term contact with water mixed in the engine oil and metal ions derived from additives. There is a demand for the development of acrylic rubber having excellent hydrolysis resistance.

(2) Since acrylic rubber is a polyacrylate having an ester bond, it is hydrolyzable and susceptible to water.

(3) Acrylic rubber is hardened and deteriorated by hydrolysis, and its function as a sealing material is lowered due to the deterioration of compression set characteristics.

(4) Since acrylic rubber sealing materials are often used around oil, oil resistance and cold resistance in consideration of use in cold regions are also important, ad material design that optimizes these physical properties is required.

Patent Document 1 proposes a acrylic rubber comprising (a) 10 to 20 wt. % of methyl methacrylate unit, (b) 15 wt. % or less of ethyl acrylate unit, (c) 60 to 80 wt. % of n-butyl acrylate unit, (d) 10 to 30 wt. % of 2-methoxyethyl acrylate unit, and (e) 0.5 to 5 wt. % of crosslinking site monomer unit. Patent Document 1 indicates that this acrylic rubber provides an acrylic rubber crosslinked product having a good balance between oil resistance and cold resistance, and further having excellent hydrolysis resistance.

Patent Document 1 does not refer to a case of using n-butyl acrylate as component (c) in amount of less than 60 wt. %; however, as shown in the results of Comparative Examples 1 and 2, described later, when 34.2 wt. % of n-butyl acrylate is used, all of oil resistance, cold resistance, and hydrolysis resistance cannot be satisfied.

PRIOR ART DOCUMENT

Patent Document

Patent Document 1: WO 2016/002936 A1

OUTLINE OF THE INVENTION

Problem to be Solved by the Invention

An object of the present invention is to provide n acrylic rubber that has hydrolysis resistance improved by introducing a specific alkyl acrylic monomer with extremely low hydrolysis property, i.e. low hydrophilicity, and that satisfies all of oil resistance, cold resistance, and hydrolysis resistance in a well-balanced manner.

Means for Solving the Problem

The above object of the present invention can be achieved by an acrylic rubber comprising a copolymer of a monomer mixture of:

| | |
|---|---|
| alkoxyalkyl acrylate | 25 to 46 wt. % |
| 2-ethylhexyl acrylate | 23 to 37 wt. % |
| alkyl methacrylate | 9 to 17 wt. % |
| monoalkyl fumarate | 1 to 3 wt. % |
| ethyl acrylate | remaining amount |

Effect of the Invention

The acrylic rubber according to the present invention adjusts the polarity by copolymerizing 2-ethylhexyl acrylate having low polarity and low hydrophilicity with alkoxyalkyl acrylate having high polarity; that is, the acrylic rubber satisfies all of oil resistance, cold resistance, and hydrolysis resistance. Therefore, the acrylic rubber can be effectively used as a crosslinking molding materials for seals, such as oil seals. O-rings, gaskets, and packings, a well as for hoses.

EMBODIMENTS FOR CARRYING OUT THE INVENTION

The acrylic rubber according to the present invention comprises a copolymer of a monomer mixture of: 25 to 46 wt. %, preferably 28 to 45 wt.%, of alkoxyalkyl acrylate, preferably 2-methoxyethyl acrylate; 23 to 37 wt. %, preferably 24 to 36 wt. %, of 2-ethylhexyl acrylate; 9 to 17 wt. %, preferably 10 to 16 wt. %, of alkyl methacrylate, preferably methyl metacrylate; 1 to 3 wt %, preferably 1.5 to 2.0 wt. %, of monoalkyl fumarate, preferably monobutyl fumarate; and a remaining amount, preferably 10 to 25 wt. %, of ethyl acrylate.

If the amount of alkoxyalkyl acrylate is larger than this range, hydrolysis resistance is inferior. In contrast if the amount of alkoxyalkyl acrylate is less than this range, oil resistance is inferior.

If the amount of 2-ethylhexyl acrylate (octyl acrylate) is larger than this range, oil resistance is inferior. In contrast, if the amount of 2-ethylhexyl acrylate is less than this range, hydrolysis resistance is inferior.

If the amount of alkyl methacrylate is larger than this range, cold resistance is inferior. In contrast, if the amount of alkyl methacrylate is less than this range, hydrolysis resistance is inferior.

In the copolymer, other copolymerizable monomers can be copolymerizd, as long as the properties thereof are not impaired. Examples of such copolymerizable monomers include vinyl compounds such as styrene, vinyl toluene, α-methyl styrene, vinyl naphthalene, acrylonitrile, methacrylonitrile, acetone acrylamide, 2-hydroxyethyl acrylate, 4-hydroxybutyl acrylate, 2-hydroxy-3-chloropropyl (meth)acrylate, vinyl chloride, vinylidene chloride, vinyl fluoride, vinylidene fluoride, chloroethyl vinyl ether, hydroxyethyl vinyl ether, hydroxybutyl vinyl ether, pentafluoropropyl (meth)acrylate, trifluorethyl (meth)acrylate, etc. and diene compounds such as isoprene, pentadiene, butadiene, etc.

In the copolymer comprising each of these monomer components, in order to facilitate the emulsification and dispersion of the copolymer, a hydrophilic monomer, such as a quatemary salt of N,N-dimethylaminoethyl (meth)acrylate, polyethylene glycol mono(meth)acrylate, polypropylene glycol mono(meth)acrylate, or polyethylene glycol polypropylene glycol mono(meth)acrylate, can be further copolymerized at a ratio of 1 wt. % or less.

The copolymer is produced by an emulsion polymerization method. In the emulsion polymerization method, each monomer is emulsified and dispersed in an aqueous medium using various surfactants, preferably a nonionic surfactant, a cationic surfactant, or a mixture thereof. Then, a polymerization reaction is carried out under stirring at room temperature or under heating in the presence of a polymerization initiator. In this case, before the emulsification polymerization reaction, if necessary, the monomer mixture is emulsified ad dispersed in m aqueous medium by a powerful emulsification means, such as a high-pressure homogenizer, a colloid mill, or a ultrasonic disperser.

That is, each of these polymerizable monomers is preferably copolymerized in the presence of a surfactant emulsifier, such as a polyethylene oxide-based nonionic surfactant or a cationic surfactant, and optionally a polypropylene glycol-based compound emulsifying aid having a molecular weight of 250 to 5000, preferably 300 to 3000.

As the surfactant acting as an emulsifier, at least one of a polyethylene oxide-based nonionic surfactant and a cationic surfactant is preferably used at a ratio of 1 to 20 wt. %, preferably 5 to 15 wt. %, based on the total amount of monomers. The polyethylene oxide-based nonionic surfactant used herein is a condensation product of polyethylene oxide with hexylphenol, octylphenol, nonylphenol, polycyclic phenyl ether, hexadecanol, oleic acid, $C_{12}$-$C_{18}$ alkylamine, or sorbitan monofatty acid. A condensation product of polyethylene oxide with octylphenol or nonylphenol is preferably used.

Examples of usable cationic surfactants include quaternary ammonium salts such as stearyl trimethyl ammonium chloride, distearyldimethyl ammonium chloride, dodecyl trimethyl ammonium acetate, dodecyl trimethyl ammonium chloride, tetradecyl trimethyl ammonium chloride, hexadecyl trimethyl ammonium chloride, octadecyl trimethyl ammonium chloride, dodecyl benzyl trimethyl ammonium chloride, dodecyl methyl di(polyoxyethylene) ammonium chloride, dioctadecyl dimethyl ammonium chloride etc., and alkyl pyridinium salts.

As the polypropylene glycol-based compound as a emulsifying aid used in combination with such m emulsifier, polypropylene glycol, its terminal monomethyl ether glycerin propylene glycol adduct, or the like is used at a ratio of 10 to 100 wt. %, preferably 15 to 70 wt. %, based on the total amount of monomers. If a polypropylene glycol-based compound having a molecular weight exceeding 5000 is used, emulsion stability is reduced.

As a polymerization initiator used at a ratio of about 0.001 to 4 wt. %, preferably about 0.005 to 2 wt. %, based on the total amount of the comonomers, diacyl peroxide, peroxycarbonate, peroxyester, or the like, is used. Specific examples thereof include organic peroxides, such as tert-butyl hydroperoxide, isobutyryl peroxide, lauroyl peroxide, stearoyl peroxide, succinic acid peroxide, bis(heptafluorobutyryl) peroxide, pentafluorobutyroyl peroxide, bis(4-tert-butylcyclohexyl) peroxy dicarbonate, di-n-propyl peroxy dicarbonate, ad diisopropyl peroxy dicarbonate Depending on the polymerization method, an azo compound, inorganic peroxide, or a redox system thereof can also be used. Depending on the reaction conditions and the composition ratio, the polymerization reaction may hardly progress: in that case, the polymerization initiator may be added again during the polymerization reaction.

Moreover, in order to adjust the molecular weight, a chain transfer agent can be used, if necessary. As the chain transfer agent, for example, n-dodecyl mercaptan, octyl mercaptan, α-methyl styrene dimer, or 1,4-terpinolene, preferably n-dodecyl mercaptan, is used in an amount of about 0.001 to 0.1 parts by weight, preferably 0.01 to 0.05 parts by weight, based on 100 parts by weight of the total amount of charged monomers. As the amount of chain transfer agent increases, the molecular weight of the resulting copolymer decreases, and the breaking strength and Mooney viscosity $ML_{1-4}$ (100° C.) also decrease.

As the emulsion polymer, a aqueous latex having a solid matters content of about 10 to 40 wt. % is coagulated with a sodium sulfate aqueous solution, followed by water washing and drying, thereby obtaining an acrylic rubber.

The thus-obtained acrylic rubber generally has a weight average molecular weight Mw of about 1,000 to 8,000,000. For use in sealing materials, the Mw is preferably about 10,000 to 5,000,000.

Examples of crosslinking agents for the produced carboxyl group-containing acrylic rubber include a polyamine (salt), a combination of a polyepoxy compound, and a quaternary ammonium salt, a quaternary phosphonium salt, or a basic compound; a combination of a polyamine or a polyamine salt and a guanidine derivative; and the like. A polyamine compound is preferably used.

Examples of the polyamine compound include hexamethylenediamine, hexamethylenediamine carbamate, tetraethylenepentamine, 4,4'-methylenedianiline, m-phenylenediamine, 4,4'-diaminodiphenyl ether, and the like. Such a polyamine compound is used at a ratio of about 0.1 to 10 parts by weight, preferably about 0.2 to 5 parts by weight, based on 100 parts by weight of rubber. If the ratio is less than this rage, vulcanization is insufficient, and a vulcanizate having satisfactory tensile strength and compression set characteristics cannot be obtained. In contrast, if the polyamine compound is used at a ratio greater than this range, the elongation of the vulcanizate significantly decreases.

Such a polyamine compound is desirably used in combination with a vulcanization accelerator. As the vulcanization accelerator, for example, the followings are used at a ratio of about 0.1 to 10 parts by weight, preferably about 0.5 to 5 parts by weight, based on 100 parts by weight of rubber Alkali metal salts or alkali metal hydroxides of organic acids or inorganic acids, such as sodium stearate, potassium stearate potassium oleate, sodium carbonate, potassium carbonate, sodium hydroxide, and potassium hydroxide Quaternary ammonium salts or phosphonium salts, such as tetramethylammonium bromide, benzyltriphenylphosphonium chloride, trimethyloctadecylammonium bromide, ad tetramethylphosphonium iodide Tertiary amines, such as triethylenediamine, imidazole, pyridine, and quinoline Guanidines, such as diphenylguanidine and tetramethylguanidine A vulcanizable rubber composition is prepared by mixing each of the above components, together with other known compounding agents, such as reinforcing agents, fillers, stabilizers, plasticizers, and lubricants, by a generally used method, such as a roll mixing method or a Banbury mixing method. Vulcanization thereof is performed by combining primary vulcanization by press vulcanization or steam vulcanization, with secondary vulcanization in a oven.

EXAMPLES

The following describes the present invention with reference to Examples.

Example 1

In a separable flask equipped with a thermometer, a stirrer, a nitrogen gas inlet tube, and a Dimroth condenser tube, the following components were charged.

| | |
|---|---|
| Water | 187 parts by weight |
| Sodium lauryl sulfate | 1.6 parts by weight |
| Polyoxyethylene lauryl ether | 1.6 parts by weight |
| n-Dodecyl mercaptan | 0.01 parts by weight |
| Charged monomer mixture | |
| Ethyl acrylate [EA] | 15 parts by weight |
| 2-Methoxyethyl acrylate [MEA] | 34.2 parts by weight |
| 2-Ethylhexyl acrylate [EHA] | 34.2 parts by weight |
| Methyl methacrylate [MMA] | 15 parts by weight |
| Monobutyl fumarate [MBF] | 1.6 parts by weight |

After oxygen was sufficiently removed from the system by replacement with nitrogen gas, the following components were added.

| | |
|---|---|
| Sodium formaldehyde sulfoxylate (Rongalite, produced by Wako Pure Chemical Industries, Ltd.) | 0.0088 parts by weight |
| Tertiary butyl hydroperoxide (Perbutyl P, produced by NOF Corporation) | 0.0050 parts by weight |

Then, a polymerization reaction was initiated at room temperature, and the reaction was continued until the polymerization conversion rate reached 90% or more. In this polymerization conversion rate, the proportion of the charged monomer mixture approximately corresponds to the proportion of monomers in the produced copolymer.

The formed aqueous latex was coagulated with a 10 wt. % sodium sulfate aqueous solution, followed by water washing and drying, thereby obtaining an acrylic rubber.

Example 2

In Example 1, the amount of the MEA and EHA were changed to 44.2 parts by weight and 24.2 parts by weight, respectively.

Example 3

In Example 1, the amount of the EA and MMA ere changed to 20 parts by weight and 10 parts by weight, respectively.

Example 4

In Example 1, the amount of the EA was changed to 12 parts by weight, the amount of the MEA and EHA were changed to 35.2 parts by weight, respectively, and the amount of the MMA was changed to 16 parts by weight.

Example 5

In Example 1, the amount of the EA was changed to 23 parts by weight, the amount of the MEA was changed to 28.2 parts by weight, and the amount of the MMA was changed to 13 parts by weight.

Comparative Examples 1 to 11

In Example 1, the charged monomer mixture (part by weight) was changed a shown in Table 1 below.

TABLE

| Comparative Example | EA | BA | MEA | DIA | MMA | MBF |
|---|---|---|---|---|---|---|
| 1 | 15 | (34.2) | 34.2 | — | 15 | 1.6 |
| 2 | 20 | (34.2) | 34.2 | — | 10 | 1.6 |
| 3 | 15 | — | (24.2) | (44.2) | 15 | 1.6 |
| 4 | 15 | — | (49.2) | (19.2) | 15 | 1.6 |
| 5 | 22 | — | 34.2 | 34.2 | (8) | 1.6 |
| 6 | 19.7 | — | 29.5 | 29.5 | (19.7) | 1.6 |
| 7 | 20 | — | (22.2) | (41.2) | 15 | 1.6 |
| 8 | 15 | — | (48.2) | 25.2 | 10 | 1.6 |
| 9 | 20 | — | 43.2 | (20.2) | 15 | 1.6 |
| 10 | 15 | — | 28.2 | (45.2) | 10 | 1.6 |
| 11 | 20 | — | 26.2 | (40.2) | 12 | 1.6 |

Note 1)
BA: n-butyl acrylate
Note 2)
Numerical values in parentheses are outside the scope of the claims Preparation of Acrylic Rubber Composition The following components were kneaded using a sealed kneader.

| | |
|---|---|
| Acrylic rubber | 100 parts by weight |
| FEF carbon black | 60 parts by weight |
| Stearic acid | 1 part by weight |
| Antioxidant (Nocrac CD, produced by Ouchi Shinko Chemical Industrial Co., Ltd.) | 2 parts by weight |
| Processing aid (Paraffin 70S, produced by Sanko Chemical Industry Co., Ltd.) | 2 parts by weight |

Then, the following components were added using an open roll to prepare a crosslinkable acrylic rubber composition.

| | |
|---|---|
| Vulcanization accelerator (Vulcofac ACT55, producedby Safic-Alcan) | 1 part by weight |
| Vulcanizing agent (CHEMINOX AC6, produced by Nisso Fine Chemicals Co., Ltd.) | 0.6 parts by weight |

Production of Acrylic Rubber Crosslinked Product

The crosslinkable acrylic rubber composition was press vulcanized at 180° C. for 10 minutes, followed by oven vulcanization (secondary vulcanization) at 175° C. for 4 hours, thereby obtaining m acrylic rubber crosslinked product.

Physical Property Test of Acrylic Rubber Crosslinked Product

Normal physical properties: according to JIS K6253 corresponding to ISO 7619-1: 2010, and JIS K6251 corresponding to ISO 37: 2005

Hydrolysis resistance test: according to JIS K6258 corresponding to ISO 1817: 2015

A tensile test specimen and a volume change specimen ware each prepared in the same manner as for the normal physical property specimen. These specimens ware suspended on a stainless steel wire, ad placed in a PTFE beaker (117 mm in diameter and 146 mm in depth) by hanging. A test liquid (1 wt. % zinc chloride aqueous solution) was put therein so that the entire specimens were dipped. The beaker was placed in a stainless steel pressure-resistant container, and the container was sealed with a flange with packing. The container was placed in a oven, heated at 120° C. for 480 hours, and then allowed to cool to near room temperature. The extracted specimens were placed in a gear-type oven and dried at 120° C. for 70 hours. The thus-treated specimens ware determined for hardness, breaking strength, elongation at break, and volume change.

Oil resistance test: according to JIS K6258 corresponding to ISO 1817: 2015 Using IRM903 oil, the volume change at 150° C. after 70 hours was measured Low temperature test: according to JIS K6261 corresponding to ISO 2921: 1997 TR10 value was measured The following table 2 (Examples) ad table 3 (Comparative Examples) show the results of the above test of physical properties.

TABLE 2

| Measurement item | Example 1 | Example 2 | Example 3 | Example 4 | Example 5 |
|---|---|---|---|---|---|
| Normal physical properties | | | | | |
| Hardness (Duro A) | 69 | 66 | 67 | 68 | 64 |
| Breaking strength (MPa) | 11.8 | 12.5 | 11.2 | 11.0 | 11.0 |
| Elongation at break (%) | 195 | 190 | 170 | 180 | 160 |
| Hydrolysis resistance test | | | | | |
| Hardness (Duro A) | 88 | 93 | 88 | 87 | 85 |
| Breaking strength (MPa) | 11.7 | 14.4 | 10.8 | 13 | 13 |
| Elongation at break (%) | 95 | 80 | 65 | 120 | 110 |
| Volume change (%) Oil resistance | −7.0 | −9.8 | −9.0 | −8.0 | −8.2 |
| Volume change (%) Low temperature test | +36.3 | +19.3 | +35.5 | +36.2 | +36.5 |
| TR10 (° C.) | −25.8 | −24.7 | −29.8 | −26.7 | −27.1 |

TABLE 3

| Measurement item | Comparative Example 1 | Comparative Example 2 | Comparative Example 3 | Comparative Example 4 | Comparative Example 5 | Comparative Example 6 |
|---|---|---|---|---|---|---|
| Normal physical properties | | | | | | |
| Hardness (Duro A) | 66 | 65 | 63 | 65 | 64 | 68 |
| Breaking strength (MPa) | 12.8 | 12.1 | 11.1 | 13.2 | 10.5 | 12.8 |
| Elongation at break (%) | 185 | 160 | 200 | 175 | 140 | 240 |
| Hydrolysis resistance test | | | | | | |
| Hardness (Duro A) | 96 | 97 | 82 | 90 | 93 | 90 |
| Breaking strength (MPa) | 19.1 | 25.3 | 11.3 | 14 | 17.2 | 13.4 |
| Elongation at break (%) | 90 | 50 | 125 | 45 | 80 | 115 |
| Volume change (%) Oil resistance | −11.3 | −14.1 | −6.2 | −10.1 | −12.6 | −6.2 |
| Volume change (%) Low temperature test | +14.8 | +14.6 | +57.4 | +13.5 | +34.6 | +29.0 |
| TR10 (° C.) | −21.4 | −25.5 | −29.2 | −23.9 | −31.5 | −19.9 |

| Measurement item | Comparative Example 7 | Comparative Example 8 | Comparative Example 9 | Comparative Example 10 | Comparative Example 11 |
|---|---|---|---|---|---|
| Normal physical properties | | | | | |
| Hardness (Duro A) | 63 | 65 | 68 | 62 | 64 |
| Breaking strength (MPa) | 10.6 | 11.3 | 12.1 | 9.6 | 10.2 |
| Elongation at break (%) | 180 | 145 | 180 | 160 | 170 |
| Hydrolysis resistance test | | | | | |
| Hardness (Duro A) | 81 | 94 | 94 | 82 | 88 |
| Breaking strength (MPa) | 13.0 | 17.0 | 16.4 | 12.0 | 13.1 |
| Elongation at break (%) | 165 | 60 | 75 | 135 | 120 |
| Volume change (%) | −6.9 | −13.4. | −10.4 | −8.5 | −8.8 |

TABLE 3-continued

| Oil resistance | | | | | |
|---|---|---|---|---|---|
| Volume change (%) | +53.3 | +19.2 | +16.2 | +56.8 | +48.7 |
| Low temperature test | | | | | |
| TRW (° C.) | −27.5 | −29.2 | −22.8 | −33.9 | −30.0 |

The above results suggest the following.

(1) In each Example, the volume change after the hydrolysis resistance test is small, and oil resistance and cold resistance are well balanced.

(2) Comparative Examples 1 and 9 are superior in oil resistance, but inferior in hydrolysis resistance and cold resistance.

(3) Comparative Examples 2, 4, and 8 are superior in oil resistance, but inferior in hydrolysis resistance.

(4) Comparative Examples 3, 7, 10, and 11 are superior in hydrolysis resistance and cold resistance, but inferior in oil resistance.

(5) Comparative Example 5 is superior in cold resistance, but inferior in hydrolysis resistance.

(6) Comparative Example 6 is superior in hydrolysis resistance and oil resistance, but inferior in cold resistance.

The invention claimed is:

1. An acrylic rubber comprising a copolymer of a monomer mixture comprising:
   28.2 to 44.2 wt. % of 2-methoxyethyl acrylate;
   24.2 to 35.2 wt. % of 2-ethylhexyl acrylate;
   10 to 16 wt. % of methyl methacrylate;
   1.6 wt. % of monobutyl fumarate; and
   12 to 23 wt. % of ethyl acrylate, wherein the weight percentages of the monomers are based upon the total weight of the monomer mixture, and the weight percentages of the monomers add up to 100%.

2. The acrylic rubber according to claim 1, which has a weight average molecular weight $M_w$ of 1,000 to 8,000,000.

3. An acrylic rubber composition comprising the acrylic rubber according to claim 1 and a crosslinking agent for carboxyl group.

4. The acrylic rubber composition according to claim 3, which is used as a crosslinking molding material for sealing materials.

5. A sealing material being obtained by crosslinking molding of the acrylic rubber composition according to claim 4.

* * * * *